US006838062B2

(12) United States Patent
Goebel et al.

(10) Patent No.: US 6,838,062 B2
(45) Date of Patent: Jan. 4, 2005

(54) INTEGRATED FUEL PROCESSOR FOR RAPID START AND OPERATIONAL CONTROL

(75) Inventors: Steven G. Goebel, Victor, NY (US); William H. Pettit, Rochester, NY (US); Steven D. Burch, Honeoye Falls, NY (US); Paul T. Yu, Pittsford, NY (US); Yan Zhang, Rochester, NY (US); Michael D. Cartwright, Naples, NY (US)

(73) Assignee: General Motors Corporation, Detroit, MI (US)

( * ) Notice: Subject to any disclaimer, the term of this patent is extended or adjusted under 35 U.S.C. 154(b) by 459 days.

(21) Appl. No.: 09/992,171

(22) Filed: Nov. 19, 2001

(65) Prior Publication Data

US 2003/0093950 A1 May 22, 2003

(51) Int. Cl.[7] .................................................. H01M 8/04
(52) U.S. Cl. ........................... 422/198; 429/17; 429/13; 429/26; 429/20; 429/22; 429/24
(58) Field of Search ............................... 429/17, 13, 26, 429/20, 22, 223, 24; 422/198, 188, 189; 423/652, 651

(56) References Cited

U.S. PATENT DOCUMENTS

| 4,293,315 A | 10/1981 | Sederquist |
| 4,642,272 A | 2/1987 | Sederquist |
| 4,650,727 A | 3/1987 | Vanderborgh et al. |
| 4,659,634 A | 4/1987 | Struthers |
| 4,670,359 A | 6/1987 | Beshty et al. |
| 4,816,353 A | 3/1989 | Wertheim et al. |
| 5,271,916 A | 12/1993 | Vanderborgh et al. |
| 5,484,577 A | 1/1996 | Buswell et al. |
| 6,159,626 A * | 12/2000 | Keskula et al. ............... 429/22 |
| 6,485,853 B1 * | 11/2002 | Pettit et al. ................... 429/17 |
| 6,521,204 B1 * | 2/2003 | Borup et al. ................. 423/652 |
| 6,582,841 B2 * | 6/2003 | Okamoto et al. ............. 429/13 |
| 6,716,400 B2 * | 4/2004 | Brooks et al. ............... 422/198 |

OTHER PUBLICATIONS

Hall et al., "A Porous Media Burner for Reforming Methanol for Fuel Cell Powered Electric Vehicles," SAE Paper #950095.
Natural Gas Power Plant System (a descriptive drawing).

* cited by examiner

Primary Examiner—Glenn Caldarola
Assistant Examiner—Tom Duong
(74) Attorney, Agent, or Firm—Cary W. Brooks, Esq.; Linda M. Deschere, Esq.

(57) ABSTRACT

A fuel processor for rapid start and operational control. The fuel processor includes a reformer, a shift reactor, and a preferential oxidation reactor for deriving hydrogen for use in creating electricity in a plurality of $H_2$—$O_2$ fuel cells. A heating and cooling mechanism is coupled to at least the shift reactor for controlling the critical temperature operation of the shift reactor without the need for a separate cooling loop. This heating and cooling mechanism produces or removes thermal energy as a product of the temperature of the combustion of air and fuel. Anode effluent and cathode effluent or air are used to control the temperature output of the heating mechanism. A vaporizer is provided that heats the PrOx reactor to operating temperature.

18 Claims, 4 Drawing Sheets

INTEGRATED FUEL PROCESSOR FOR RAPID START AND OPERATIONAL CONTROL

FIELD OF THE INVENTION

The present invention generally relates to fuel processors and, more particularly, relates to a fuel processor having a two-stage lean combustion system for rapid start of the fuel processor and thermal integration for reactor tempterature control.

BACKGROUND OF THE INVENTION $H_2$—$O_2$ fuel cells use hydrogen ($H_2$) as a fuel and oxygen (as air) as an oxidant. The hydrogen used in the fuel cell can be derived from the reformation of a hydrocarbon fuel (e.g. methanol or gasoline). For example, in a steam reformation process, a hydrocarbon fuel (such as methanol) and water (as steam) are ideally reacted in a catalytic reactor (a.k.a. "steam reformer") to generate a reformate gas comprising primarily hydrogen and carbon monoxide.

An exemplary steam reformer is described in U.S. Pat. No. 4,650,727 to Vanderborgh. For another example, in an autothermal reformation process, a hydrocarbon fuel (such as gasoline), air and steam are ideally reacted in a combine partial oxidation and steam reforming catalytic reactor (a.k.a. autothermal reformer) to generate a reformate gas containing hydrogen and carbon monoxide. An exemplary autothermal reformer is described in U.S. application Ser. No. 09/626,553 filed Jul. 27, 2000. The reformate exiting the reformer contains undesirably high concentrations of carbon monoxide most of which must be removed to prevent poisoning of the catalyst of the fuel cell's anode. In this regard, carbon monoxide (i.e., about 3–10 mole %) contained in the $H_2$-rich reformate/effluent exiting the reformer must be reduced to very low nontoxic concentrations (i.e., less than about 20 ppm) to avoid poisoning of the anode.

It is known that the carbon monoxide, CO, level of the reformate/effluent exiting a reformer can be reduced by utilizing a so-call "shift" reaction wherein water (i.e. steam) is added to the reformate/effluent exiting the reformer, in the presence of a suitable catalyst. This lowers the carbon monoxide content of the reformate according to the following ideal shift reaction:

$CO + H_2O \rightarrow CO_2 + H_2$.

Some (i.e., about 0.5 mole % or more) CO still survives the shift reaction. Hence, shift reactor effluent comprises hydrogen, carbon dioxide, water carbon monoxide, and nitrogen.

The shift reaction is not enough to reduce the CO content of the reformate enough (i.e., to below about 20–200 ppm). Therefore, it is necessary to further remove carbon monoxide from the hydrogen-rich reformate stream exiting the shift reactor, and prior to supplying it to the fuel cell. It is known to further reduce the CO content of $H_2$-rich reformate exiting the shift reactor by a so-called "PrOx" (i.e., preferential oxidation) reaction effected in a suitable PrOx reactor operated at temperatures which promote the preferential oxidation of the CO with air in the presence of the $H_2$, but without consuming/oxidizing substantial quantities of the $H_2$ or triggering the so-called "reverse water gas shift" (RWGS) reaction. The PrOx and RWGS reactions are as follows:

$CO + \frac{1}{2} O_2 \rightarrow CO_2$ (PrOx)

$CO_2 + H_2 \rightarrow H_2O + CO$ (RWGS)

The PrOx process is described in a paper entitled "Methanol Fuel Processing for Low Temperature Fuel Cells" published in the Program and Abstracts of the 1988 Fuel Cell Seminar, Oct. 23–26, 1988, Long Beach, Calif., and in Vanderborgh et al U.S. Pat. No. 5,271,916, inter alia.

Desirably, the $O_2$ required for the PrOx reaction will be about two times the stoichiometric amount required to react the CO in the reformate. If the amount of $O_2$ exceeds about two times the stoichiometric amount needed, excessive consumption of $H_2$ results. On the other hand, if the amount of $O_2$ is substantially less than about two times the stoichiometric amount needed, insufficient CO oxidation may occur and there is greater potential for the RWGS reaction to occur. Accordingly in practice, many practitioners use about 4 or more times the stoichiometric amount of $O_2$ than is theoretically required to react with the CO.

PrOx reactors may be either (1) adiabatic (i.e. where the temperature of the reactor is allowed to rise during oxidation of the CO) or (2) isothermal (i.e. where the temperature the reactor is maintained substantially constant during oxidation of the CO). The adiabatic PrOx process is sometimes effected via a number of sequential stages, which progressively reduce the CO content in stages, and requires careful temperature control, because if the temperature rises too much, the RWGS reaction can occur which counter productively produces more CO. The isothermal process can effect the same CO reduction as the adiabatic process, but in fewer stages and without concern for the RWGS reaction if (1) the reactor temperature can be kept low enough, and (2) $O_2$ depletion near the end of the reactor can be avoided.

One known isothermal reactor is essentially a catalyzed heat exchanger having a thermally conductive barrier or wall that separates the heat exchanger into (1) a first channel through which the $H_2$-rich gas to be decontaminated (i.e. CO removed) passes, and (2) a second channel through which a coolant flows to maintain the temperature of the reactor substantially constant within a defined working range. The barrier wall has a catalyzed first surface confronting the first channel for promoting the CO+$O_2$ reaction and an uncatalyzed second surface confronting the second channel for contacting the coolant therein to extract heat from the catalyzed first surface through the barrier. The catalyzed surfaces of adjacent barriers oppose each other, and are closely spaced from each other, so as to define a narrow first channel through which the $H_2$-rich gas moves.

The reformation process of gasoline or other hydrocarbons operate at high temperatures (i.e. about 600–800° C.). The water gas shift reactor is active at temperatures of 250–450° C., The PrOx reaction is active at temperatures of 100–200° C. Thus, it is necessary that the reformer, the water gas shift (WGS) reactor, and the PrOx reactor are each heated to temperatures sufficient for the fuel processor to operate. During start-up, however, a conventional fuel processor is such that the heating of various components is staged. This approach can lead to undesirable lag time for bringing the system on line. Alternately, external electrical heat sources (i.e. heaters) may be employed to bring the components to proper operating temperatures. This approach requires an external source of electricity such as a battery.

Accordingly, there exists a need in the relevant art to provide a fuel processor that is capable of heating the fuel processor components quickly to achieve these high operating temperatures for startup. Furthermore, there exists a need in the relevant art to provide a fuel processor that maximizes this heat input into the fuel processor while minimizing the tendency to form carbon. Still further, there exists a need in the relevant art to provide a fuel processor capable of heating the fuel processor while minimizing the use of electrical energy during startup and the reliance on catalytic reactions.

SUMMARY OF THE INVENTION

According to the principles of the present invention, a fuel processor for rapid start and operational control is provided having an advantageous construction. The fuel processor includes a reformer, a shift reactor, and a preferential oxidation reactor for deriving hydrogen for use in creating electricity in a plurality of $H_2$—$O_2$ fuel cells. A heating or cooling mechanism, as required, is coupled to at least the shift reactor for controlling the critical temperature operation of the shift reactor without the need for a separate cooling loop. This heating mechanism produces thermal energy as a product of the combustion of air and fuel. Anode effluent and cathode effluent or air is used to control the temperature output of the heating mechanism.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For example, the present invention is hereafter described in the context of a fuel cell fueled by reformed gasoline. However, it is to be understood that the principles embodied herein are equally applicable to fuel cells fueled by other reformable fuels.

Figure 1:
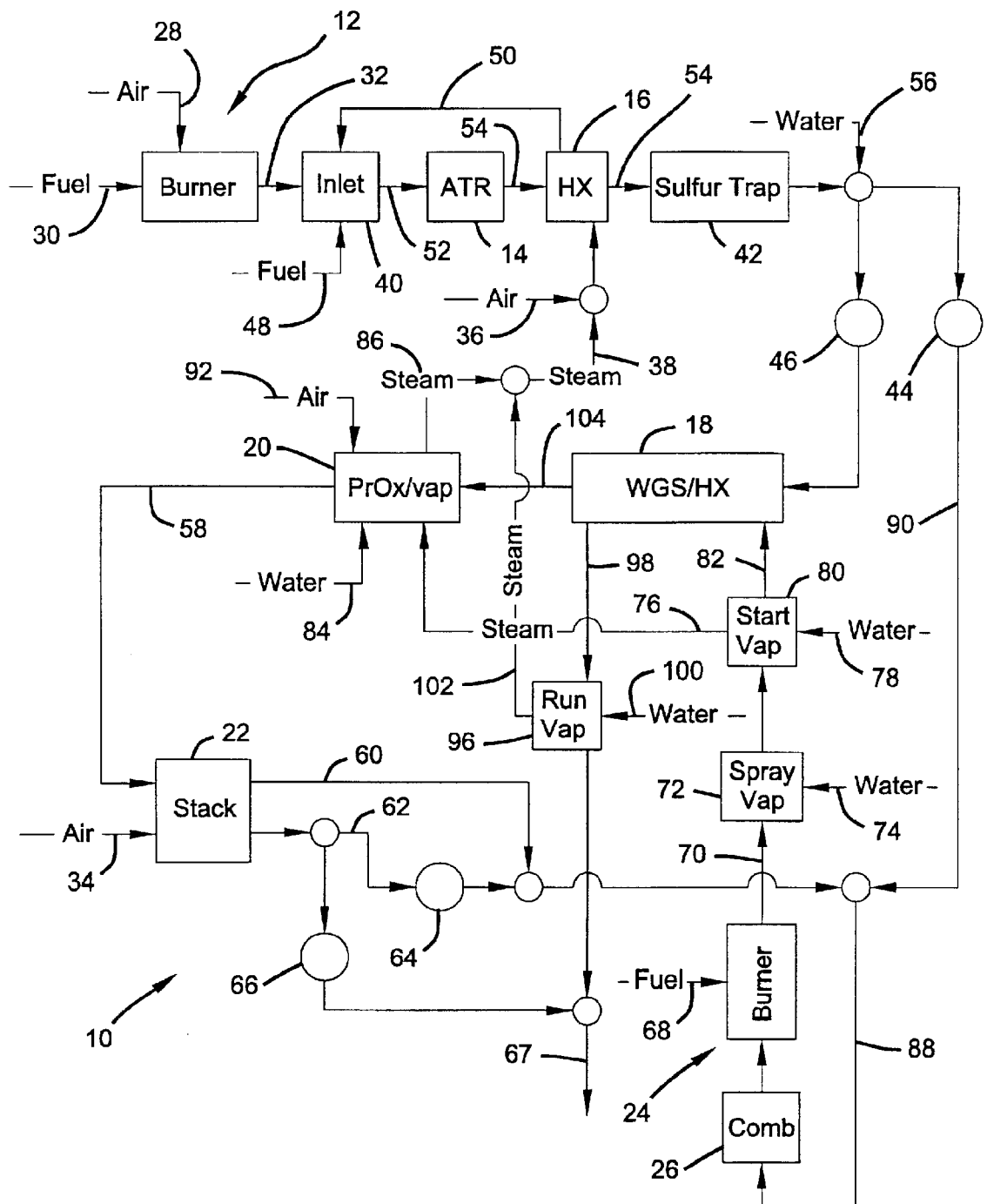
FIG. 1 is a schematic view illustrating a fuel processor according to a first embodiment of the present invention.

Referring to FIG. 1, a fuel processor, generally indicated as 10, according to a first embodiment of the present invention is illustrated. Fuel processor 10 generally includes a first burner system 12, an auto thermal reformer (reformer) 14, a heat exchanger 16, a water gas shift reactor/heat exchanger (WGS/HX) 18, a preferential oxidation/vaporizer (PrOx/vaporizer) reactor 20, a fuel cell stack 22, a second burner system 24, and a catalytic combustor (comb) reactor 26.

First burner system 12 and second burner system 24 are primarily used to heat the components of fuel processor 10 during a startup cycle to achieve rapidly and efficiently an optimal operational temperature within fuel processor 10. First burner system 12 and second burner system 24 may burn various types of fuels, such as but not limited to hydrocarbons or hydrogen. Following such, fuel processor 10 is then capable of efficiently producing electrical energy through the combination of hydrogen and oxygen according to known fuel cell technology. First burner system 12 and second burner system 24 are each of either a premixed or diffusion-type burner that produces heat through internal combustion. The rate of heating is determined by the heating value of the fuel that is burned. The amount of fuel burned is dependent upon the air stream rate at near overall stoichiometric conditions. First burner system 12 and second burner system 24 could be thermal or catalytic in design.

Preferably, combustion heating occurs in two stages, namely within first burner system 12 and second burner system 24, to minimize the initial temperature of the gases that are necessary to efficiently and quickly heat reformer 14, WGS/HX 18, PrOx/vaporizer reactor 20, and a catalytic combustor 26 to operating temperature. That is, reformer 14, WGS/HX 18, PrOx/vaporizer reactor 20, and catalytic combustor 26 are each susceptible to damage if exposed to excessive temperature. However, in order to heat these components to a predetermined operating temperature with a single burner, it is necessary that the output gases of the single burner be sufficiently heated initially to carry enough heat downstream to heat the remaining components. Therefore, the output gases of the single burner may pose a risk to upstream components since the temperature may be above that which the upstream component is capable of tolerating. Accordingly, it is preferable to employ a two stage heating system to effectively heat all components during start up without exposing such components to excessive temperature. Combustion in two stages also serves to reduce the maximum flame temperature, which reduces the production of undesirable $NO_x$ formation. Alternatively, combustion could occur in more than two stages for improved local control of the resultant heating. For example, an additional burner could be used to heat WGS/HX 18 and PrOx/vaporizer reactor 20 directly.

As best seen in FIG. 1, fuel processor 10 is arranged such that first burner system 12 includes a first air inlet stream 28 and a first fuel inlet stream 30. First air inlet stream 28 may be obtained as a direct feed from a system air compressor (not shown) or from the air feed 34 to fuel cell stack 22. The use of air from the air feed 34 to fuel cell stack 22 may provide additional flow rates to achieve higher heating capacity, if required.

The heated exhaust stream of first burner system 12, generally indicated as 32, exits first burner system 12 as a fuel lean combustion exhaust to heat the downstream components of fuel processor 10. The particular temperature of first burner exhaust stream 32 is preferably sufficient to heat the catalyst within reformer 14 to its optimized operating temperature, typically in the range of about 600–800° C. for hydrocarbons, such as gasoline. To this end, first burner system 12 is preferably a premixed or diffusion-type and includes a high temperature zone for flame stability. It is contemplated that first burner exhaust stream 32 of first burner system 12 may be diluted with downstream air (not shown) to control the first burner exhaust stream to a temperature suitable to heat the catalyst within reformer 14. This downstream air may be obtained by diverting a portion of first air inlet stream 28 within first burner system 12 or may be obtained by utilizing another air source (i.e. reformer air 36). However, first air inlet stream 28 is preferably obtained as a direct feed from a compressor or from temporarily bypassing fuel cell stack 22 and using air supply from a stack air inlet stream 34 to achieve a high flow rate of air. This arrangement, as illustrated in FIG. 1, minimizes the pressure drop through fuel processor 10 by preventing air from first air inlet stream 28 from passing through heat exchanger 16 during startup and, further, by preventing a reformer air inlet stream 36 or a reformer steam 38 from passing through first burner system 12 during normal operation.

Accordingly, first burner exhaust stream 32 from first burner system 12 sequentially heats a reformer inlet zone 40, reformer 14, heat exchanger 16, and a sulfur trap 42. A bypass valve 44 is opened and a WGS valve 46 is closed such that first burner exhaust stream 32 bypasses WGS/HX 18 and flows to catalytic combustor 26 and second burner system 24. However, it should be understood that bypass valve 44 and WGS valve 46 might be replaced with a single three-way valve (see FIG. 3). However, this two-valve arrangement enables bypass valve 44 to be located away from the high temperature of reformate gas stream 54. Therefore, bypass valve 44 may be made of lower temperature, better sealing materials to eliminate any leaks of reformate to catalytic combustor 26, which may lead to a loss to system efficiency.

It is believed that a brief description of the remaining components and connections of fuel processor 10 is beneficial to adequately describe the startup procedures and components. Hence, with reference to a "normal" operation (e.g. after the system has started up and is running), reformer inlet zone 40 includes a reformer fuel inlet stream 48, such as gasoline, and reformer air and inlet flow 50 from heat exchanger 16 to produce an inlet stream 52. Inlet stream 52 enters reformer 14 and catalytically reacts the fuel from reformer fuel inlet stream 48 and air and water from reformer inlet flow 50 to form a $H_2$-rich reformate gas stream 54. Reformate gas stream 54 passes through heat exchanger 16, which removes excess heat generated during the reformation cycle from reformate gas stream 54. This heat is then used by heat exchanger 16 to heat a mixture of reformer air inlet stream 36 and reformer steam 38 to produce reformer inlet flow 50. Reformate gas stream 54 then passes through sulfur trap 42 to remove sulfur and other hydrocarbons and upon exit mixes with a water flow 56 to control the temperature into WGS/HX 18 and further to humidify the effluent.

During normal operation, WGS valve 46 is open such that the humidified reformate gas stream 54 passes therethrough to WGS/HX 18 and PrOx/vaporizer reactor 20. As mentioned above, WGS/HX 18 is a water gas shift reactor and heat exchanger combination system. The heat exchanger portion of WGS/HX 18 is fluidly separate from the water gas shift reactor portion to enable efficient heating of the shift reactor catalyst during the startup procedure.

PrOx/vaporizer reactor 20 is a preferential oxidation reactor and a vaporizer system. The vaporizer portion of PrOx/vaporizer reactor 20 is used as a heat exchanger to remove excess heat from the preferential oxidation reaction and to produce reformer steam 86 and separate the reaction catalysts from the steam flow. WGS/HX 18 and PrOx/vaporizer reactor 20 are used to reduce CO-level therein to acceptable levels. The CO-depleted, $H_2$-rich reformate stream 58 is then fed into the anode side of fuel cell stack 22. Simultaneously, oxygen from stack air inlet stream 34 is fed into the cathode side of fuel cell stack 22. The hydrogen from reformate stream 58 reacts with the oxygen from stack air inlet stream 34 across a membrane electrode assembly to produce electricity. Anode exhaust or stack effluent 60 from the anode side of fuel cell stack 22 includes a portion of hydrogen that is directed back to catalytic combustor 26 to provide heat. Cathode exhaust 62 from the cathode side of fuel cell stack 22 includes oxygen also for use in catalytic combustor 26. The flow of cathode exhaust 62 to catalytic combustor 26 is controlled via a pair of control valves, namely a combustor air control valve 64 and a cathode exhaust back pressure valve 66. The closing of cathode exhaust back pressure valve 66 produces a back pressure that forces air through combustor air control valve 64 for combustion in catalytic combustor 26. The opening of cathode exhaust back pressure valve 66 permits flow to an exhaust 67.

During a startup cycle, bypass valve 44 is opened and WGS valve 46 is closed, thereby sending the lean gases of first burner system 12 indirectly to second burner system 24. It should be understood that it is necessary to bypass WGS/HX 18 when lean combustion gases are flowing within fuel processor 10, since the oxygen within the combustion gases may react with the CuZn catalyst that is typically used in water gas shift (WGS) reactors. However, if WGS/HX 18 includes a nonpyrophoric catalyst, bypass valve 44 and WGS valve 46 are not necessary and lean combustion gases may be permitted to flow along the normal operation path through fuel cell stack 22 to second burner system 24 to simplify fuel processor 10. Generally, it is undesirable to allow dry air to flow through fuel cell stack 22 for extended periods of time due to the drying of the membranes typically used in PEM stacks. However, according to the principles of the present invention, if valves 44, 46 were not used, the resultant gas flow through fuel cell stack 22 is acceptable since it contains moisture, which is a product of the lean combustion within first burner system 12 and very low carbon monoxide levels to prevent "poisoning" of the catalysts. If desired, a bypass valve may be used to bypass fuel cell stack 22.

Second burner system 24 is used to indirectly heat catalytic combustor 26, WGS/HX 18, and PrOx/vaporizer reactor 20. Second fuel inlet stream 68 is introduced downstream of catalytic combustor 26 and into second burner system 24 such that during the combustion process, most of the remaining oxygen is consumed. However, it should be noted that it is preferable to remain slightly fuel lean within second burner system 24 to insure that unburned hydrocarbons are not present in the heated exhaust stream 70. Second burner system 24 is preferably a premixed or diffusion-type. More preferably, second burner system 24 is a premixed type when used with liquid fuel to reduce the amount of emissions produced by the flame.

Figure 2:
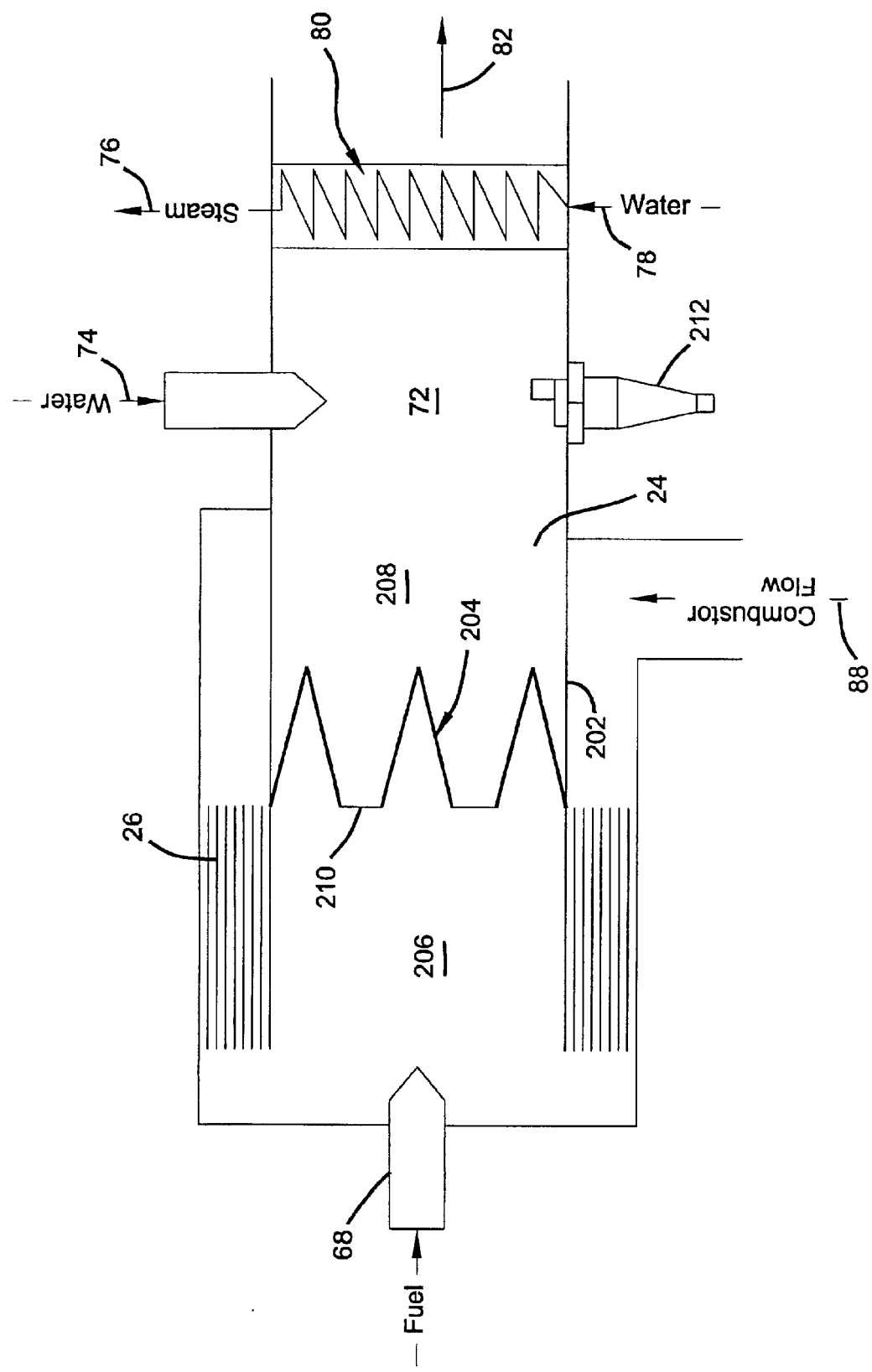
FIG. 2 is a schematic illustration of a combustion burner system.

As best seen in FIG. 2, catalytic combustor 26 is indirectly heated. That is, under start conditions, combustor gas flow 88 to second burner system 24 is the product of lean combustion in first burner system 12 flowing through bypass valve 44. Combustor gas flow 88 is indirectly heated across a liner 202, which separates a flame 204 of second burner system 24 from combustor gas flow 88. Second fuel inlet stream 68 is added to and mixes with combustor gas flow 88 after catalytic combustor 26. For premix operation, second fuel inlet stream 68 is injected and mixes with the gas exiting the catalytic combustor 26 in a mixing chamber 206 before introduction into flame chamber 208. For diffusion operation, there is no mixing in chamber 206 and second fuel inlet stream 68 is injected downstream of a flame holder 210 and directly into flame 204. For liquid fuel operation, the premixed approach is preferred so as to reduce the amount of emissions from flame 204. Flame holder 210 may be of any conventional type, such as but not limited to a swirler, perforated plate (as shown in FIG. 2), backward facing step, bluff body, or transverse jets. Flame 204 can be initiated by spark plug 212.

As best seen in FIGS. 1 and 2, a spray vaporization zone 72 is downstream from second burner system 24, which employs a spray water stream 74 to reduce the gas temperature of exhaust stream 70 exiting second burner system 24 in the event the exit temperature of exhaust stream 70 is too high for a start vaporizer 80 or WGS/HX 18. The temperature of exhaust stream 70 exiting second burner system 24 is reduced as it passes through spray vaporization zone 72 and start vaporizer 80 to produce exhaust stream 82. Exhaust stream 82 then flows through the heat exchanger of WGS/HX 18 and a run vaporizer 96 to exhaust 67.

Thermal energy from second burner system 24 is also utilized by initiating a start vaporizer water stream 78 though start vaporizer 80 to produce a start vaporizer steam flow 76. Start vaporizer steam flow 76 flows across the backside of PrOx/vaporizer reactor 20 to heat PrOx/vaporizer reactor 20, since the saturation temperature of start vaporizer steam flow 76 (134° C. at 3 atm.) complements the operating temperature of the catalyst within PrOx/vaporizer reactor 20. It should be appreciated that utilizing the heat of vaporization can transfer significant thermal energy. Drains for eliminating condensed water may be incorporated to avoid the use of thermal energy to revaporize the condensed water. PrOx/vaporizer reactor 20 is of a heat exchanger type construction to separate the reaction catalyst from start vaporizer steam flow 76, a PrOx inlet water flow 84, and the resulting PrOx steam flow 86 that is generated.

PrOx steam flow 86 provides additional heating of heat exchanger 16, in addition to the direct heat provided to heat exchanger 16 by first burner system 12. If during the startup cycle the temperature of a WGS/HX exhaust exit flow 98 exceeds the vaporization temperature (typically about 150° C.), run vaporizer 96 can generate additional steam 102. That is, a run water 100 entering run vaporizer 96 is adjusted so that steam 102 is slightly superheated. Steam 102 joins with PrOx steam flow 86 to form reformer steam 38, which flows to heat exchanger 16. This process may be used to provide additional heating of heat exchanger 16.

During a rapid start up cycle of fuel processor 10, full air flow is introduced in first air inlet stream 28 of first burner system 12. Bypass valve 44 is opened and WGS valve 46 is closed so as to route a flow 90 to second burner system 24. Ignition members 212, such as spark plugs, within first burner system 12 and second burner system 24 are energized. Simultaneously, first fuel inlet stream 30 and second fuel inlet stream 68 are introduced to first burner system 12 and second burner system 24, respectively, to start combustion. Alternate sequencing may be appropriate depending on the mechanization hardware. Alternate scenarios could light off at reduced flow or lead with first burner system 12 or second burner system 24. Confirmation of combustion within first burner system 12 and second burner system 24 is obtained by sensors such as flame ionization or temperature measurement of first burner exhaust stream 32 and at the exit of spray vaporization zone 72, respectively. First fuel inlet stream 30 is controlled to produce the desired temperature for the catalyst within reformer 14 (typically about 600–800° C.) for gasoline type hydrocarbons.

Second fuel inlet stream 68 is controlled to maintain near overall stoichiometric conditions to maximize the heat input to fuel processor 10 for rapid startup. That is, the total fuel flow, which equals the sum of first fuel inlet stream 30 and second fuel inlet stream 68, reacts and consumes nearly all the oxygen provided by first air inlet stream 28 to maximize the combustion heat produced without resulting in unburned hydrocarbons.

Spray water stream 74 is introduced within spray vaporization zone 72 to maintain the proper temperature of exhaust stream 82 through the vaporization of water so as not to exceed the temperature limits of the downstream components. That is, spray water stream 74 ensures that start vaporizer 80, downstream from spray vaporization zone 72, is not exposed to excessively high temperatures (i.e. greater than about 600° C.). Moreover, spray water stream 74 ensures that exhaust stream 82 are not excessively heated (typically less than about 300° C.) so as not to damage the CuZn type WGS catalyst. The control temperature may be altered with the usage of precious metal based catalysts. A reduction in gas temperature further occurs across start vaporizer 80 due to vaporization of start vaporizer water stream 78. The quantity of start vaporizer water stream 78 is limited such that start vaporizer steam flow 76 is slightly superheated (typically about 150° C.). Further reduction in the quantity of start vaporizer water stream 78 is utilized to favor heating WGS/HX 18 rather than PrOx/vaporizer reactor 20. The start operation is controlled as described above until fuel processor 10 is heated to a predetermined temperature for normal operation.

Once the catalyst of PrOx/vaporizer reactor 20 and the catalyst of WGS/HX 18 are above their minimum operation temperatures (typically about 100° C. and about 220° C., respectively) and reformer steam 38 is flowing through heat exchanger 16, fuel processor 10 is ready to begin normal operation. To determine whether such operating temperatures have been achieved, it is preferable to monitor and compare the temperature of PrOx steam flow 86 to the operating temperature of PrOx/vaporizer reactor 20 and the temperature of WGS/HX exhaust exit flow 98 to the operating temperature of WGS/HX 18. The availability of steam is determined by monitoring the temperature of reformer air and steam flow 50. For high sulfur fuels, it is preferably that sulfur be removed from the liquid fuel or sulfur trap 42 be at its operating temperature (typically about 300–500° C.) to ensure full capacity such that sulfur does not pass to the catalyst of WGS/HX 18 or other downstream catalysts, as such catalyst may be damaged by the presence of sulfur.

Normal, fuel rich operation may be accomplished via several methods. For instance, fuel rich reformer flow for normal operation can be established by starting reformer fuel inlet stream 48 and reformer air inlet stream 36, and closing first air inlet stream 28 and first fuel inlet stream 30. Preferably, this transition occurs rapidly so as to not linger at near stoichiometric conditions due to the excessively high associated reaction temperatures. Moreover, this transition should preferably occur quickly such that an atomic-oxygen-in-air-flow-to-carbon-in-fuel-flow ratio (oxygen-to-carbon ratio) of less than one is not encountered, which may produce undesirable carbon.

Alternatively, normal, fuel rich operation may be established by initially fully closing first fuel inlet stream 30 and first air inlet stream 28 to first burner system 12. Reformer air inlet stream 36 and reformer fuel inlet stream 48 is then initiated in a way to preferably avoid operation near stoichiometric conditions or oxygen-to-carbon ratio of less than one. However, operation in conditions where the oxygen-to-carbon ratio is less than one is permitted when steam flow is available. It is important to note that at least some steam flow is available after the start-up cycle from start vaporizer 80, run vaporizer 96, and PrOx/vaporizer reactor 20, which have all been preheated during the start-up cycle.

The change to fuel rich reformer operation is accompanied by the closing of second fuel inlet stream 68 and the addition of cathode exhaust 62 to catalytic combustor 26 to complete combustion before exhaust. To this end, catalytic combustor 26 must be kept sufficiently lean to maintain the catalyst temperature below its operating limit (typically about 750° C.). To this point, reformer fuel inlet stream 48 is below its full power setting to insure that the operation of catalytic combustor 26 is within acceptable temperature limits (less than about 750° C.).

Once a stable flow through reformer 14 is established, WGS valve 46 is opened and bypass valve 44 is closed to direct reformate gas stream 54 through the WGS portion of WGS/HX 18, the PrOx portion of PrOx/vaporizer reactor 20, and fuel cell stack 22. In conjunction with the changing of valve positions of bypass valve 44 and WGS valve 46, the flow of a PrOx air inlet stream 92 and PrOx inlet water flow 84 is initiated into PrOx/vaporizer reactor 20. As fuel cell stack 22 draws current, the hydrogen content of anode exhaust stream 60 is greatly reduced, which reduced the reaction temperature within catalytic combustor 26. Hence, spray water stream 74, if used, is controlled to produce the desired temperature until it can eventually be shut off. Start vaporizer water stream 78 to start vaporizer 80 is also shut off and the control of the exit temperature of WGS/HX 18 is regulated using combustor air control valve 64, which controls the cathode exhaust stream 62 to catalytic combustor 26.

If not initiated previously, run water 100 is initiated to run vaporizer 96 once the temperature of WGS/HX exhaust exit flow 98 exceeds the water vaporization temperature (typically about 150° C.). The quantity of run water 100 is determined within the energy availability of WGS/HX exhaust exit flow 98 to fully vaporize and the quantity of water available or desired for operation. Run vaporizer steam flow 102 is available for reformer steam flow 38. Fuel processor 10 is now in a normal operating mode for producing electricity.

For normal operation, reformer air inlet stream 36 to reformer fuel inlet stream 48 ratio is set to provide the desired reformer reaction exit temperature (typically about 750° C.). The temperature of reformate gas stream 54 into the front end of WGS/HX 18 (typically about 250° C.) is controlled by the quantity of water flow 56 atomized into and vaporized by reformate gas stream 54.

PrOx air inlet stream 92 is set to provide the required carbon monoxide clean-up for fuel cell stack 22. Similarly, PrOx inlet water flow 84 is set to remove the associated heat release from PrOx/vaporizer reactor 20. PrOx inlet water flow 84 is also set to provide single phase PrOx steam flow 86 as indicated by temperature measurements of this stream. Alternate embodiments may adjust PrOx air and water flows to obtain optimum performance. For example, excess PrOx air may be used to handle CO spikes, or two phase PrOx steam may be used to provide thermal balance. Run vaporizer steam flow 102 is used as a surplus to increase the fuel processor efficiency or to meet transient steam flow requirements of the system, but is not utilized for thermal balance. The increased steam 102 provided by run vaporizer 96 also reduces the carbon monoxide level from reformer 14, which helps to minimize the exotherm within WGS/HX 18. Steam 102 from run vaporizer 96 can also be used to moderate variations in reformer steam 38 or the molar steam flow to atomic carbon in fuel flow ratio (steam-to-carbon ratio). Further control of overall steam flow can be achieved through the use of PrOx/vaporizer reactor 20. That is, if additional steam flow is required during transient operation, PrOx air inlet stream 92 can be increased to provide additional thermal energy by exothermic reaction with reformate gas stream 104 within PrOx/vaporizer reactor 20 to vaporize additional water delivered to PrOx/vaporizer reactor 20 via PrOx inlet water flow 84.

To increase or decrease the output from fuel processor 10, reformer fuel inlet stream 48 is increased or decreased, respectively, and the commensurate changes in air and water flows throughout the system are made to maintain the system thermal balance and stoichiometry as described above. The commensurate changes in air and water flows may lead or lag behind the changes in fuel flow to achieve the optimal response time and control within the desired reactor operating regimes.

It should be recognized that the present invention enables the unique capability to control the temperature of WGS/HX 18 and the ability to handle unloads of fuel cell stack 22. The temperature of reformate 54 before entering WGS/HX 18 is controlled using water flow 56. Primary control of the temperature of WGS/HX 18 is provided by exhaust stream 82. The temperature of exhaust stream 82 can be adjusted by the amount of cathode exhaust 62 directed to catalytic combustor 26 by combustor air control valve 64. According to the present embodiment, it is desirable that WGS/HX 18 operate at nearly constant temperature and within the operating limits thereof. Preferably, as described above, CuZn catalyst is used within WGS/HX 18 wherein temperatures above about 300° C. may damage the catalyst and temperatures below about 200° C. will greatly reduce the activity of the shift reaction. A challenge associated with this narrow temperature window involves the removal of heat generated by the exothermic reaction within WGS/HX 18, specifically $CO+H_2O \rightarrow CO_2+H_2+$thermal energy. By utilizing exhaust stream 82, which has a relatively high mass flow rate and thus a high heat capacity as compared to all of the available flow streams, the temperature rise (i.e. thermal energy) within WGS/HX 18 can be most effectively minimized. The ability to control the temperature of exhaust stream 82 is also important to prevent quenching of the water gas shift reaction with WGS/HX 18 (typically below about 220° C.), which may occur if the temperature of exhaust stream 82 is too low. Indirect exothermic reduction is achieved by maximizing the quantity of reformer steam 38 to reformer 14, which lowers the carbon monoxide level entering WGS/HX 18. Maximizing the quantity of run water 100 vaporized in run vaporizer 96 can also increase the flow of reformer steam 38. Still further, increasing the flow of PrOx air inlet stream 92 can increase the steam generating capacity of PrOx/vaporizer reactor 20. However, increased flow of PrOx air inlet stream 92 may decrease the efficiency of fuel processor 10, which is not desirable for steady operation, but is effective to increase steam generation during transient operations to avoid reducing the steam-to-carbon ratio or to limit the exotherm within WGS/HX 18 to maintain the temperature of the WGS catalyst below damaging levels.

At least three mechanisms are available for accommodating fuel cell stack 22 unloads. As used herein, the term unload refers to when the electric current draw from fuel cell stack 22 is reduced. Specifically, these mechanisms include 1) increasing cathode exhaust 62, 2) initiating or increasing flow of start vaporizer water stream 78 to start vaporizer 80, and 3) injecting spray water stream 74 into spray vaporization zone 72. When fuel cell stack 22 unloads, the hydrogen content of anode exhaust stream 60 increases. This increase in hydrogen content will cause the temperature from catalytic combustor 26 to increase. Since it is necessary to control the temperature of WGS/HX 18, it is necessary to limit or control the temperature of exhaust stream 70 from catalytic combustor 26. Similarly, catalytic combustor 26 has an operating temperature limit of typically about 750° C. Exceeding this operating temperature limit may damage the catalyst material within combustor 26.

As a first measure, cathode exhaust 62 is controlled to cool the catalyst of catalytic combustor 26 below its temperature limit. This enables exhaust stream 82 to be used to cool WGS/HX 18. If the temperature of catalytic combustor 26 exceed the desired temperature of WGS/HX 18 and all of the available cooling capacity of cathode exhaust 62 is used, the temperature of exhaust stream 82 is lowered by initiating or increasing flow of start vaporizer water stream 78 to start vaporizer 80. This increases the steam-to-carbon ratio of fuel processor 10. Transition of water from run vaporizer 96 to start vaporizer 80 may be appropriate to dissipate excess heat in exhaust stream 82, if excess water is not available. However, direct spray water stream 74 may be used, particularly if the temperature into start vaporizer 80 exceeds its temperature limit (typically about 600° C.) or if an increased steam-to-carbon ratio in fuel processor 10 is not desired. It is important to note that spray water stream 74 into exhaust stream 70 is typically not recovered. Of course, as the load on fuel cell stack 22 decreases, the fuel flow and the overall fuel processor output is decreased to respond to the reduced power demand.

During a fuel processor shutdown, the electrical demand is reduced to a minimum predetermined level and fuel cell stack 22 is unloaded. When fuel cell stack 22 unloads, the $H_2$ content of anode exhaust stream 60 increases and, thus, increased flow of cathode exhaust 62 through combustor air control valve 64 is required to limit the catalyst temperature of catalytic combustor 26. Bypass valve 44 is then opened and WGS valve 46 is closed to direct the reformate gas stream through bypass valve 44 to catalytic combustor 26. PrOx air inlet stream 92 and PrOx inlet water flow 84 are also shut off. Still further, run water 100, reformer air inlet stream 36, and reformer fuel inlet stream 48 are shut off. If desired, continuing the flow of cathode exhaust 62 over the backside (or HX) of WGS/HX 18 can cool WGS/HX 18. This continued flow may be desirable to reduce the temperature of the catalyst within WGS/HX 18 to lower its catalytic activity in the event it becomes exposed to air leaks after shutdown. However, WGS valve 46 and check valves (such as in anode exhaust 60) provide protection against air leaking into WGS/HX 18.

Figure 3:
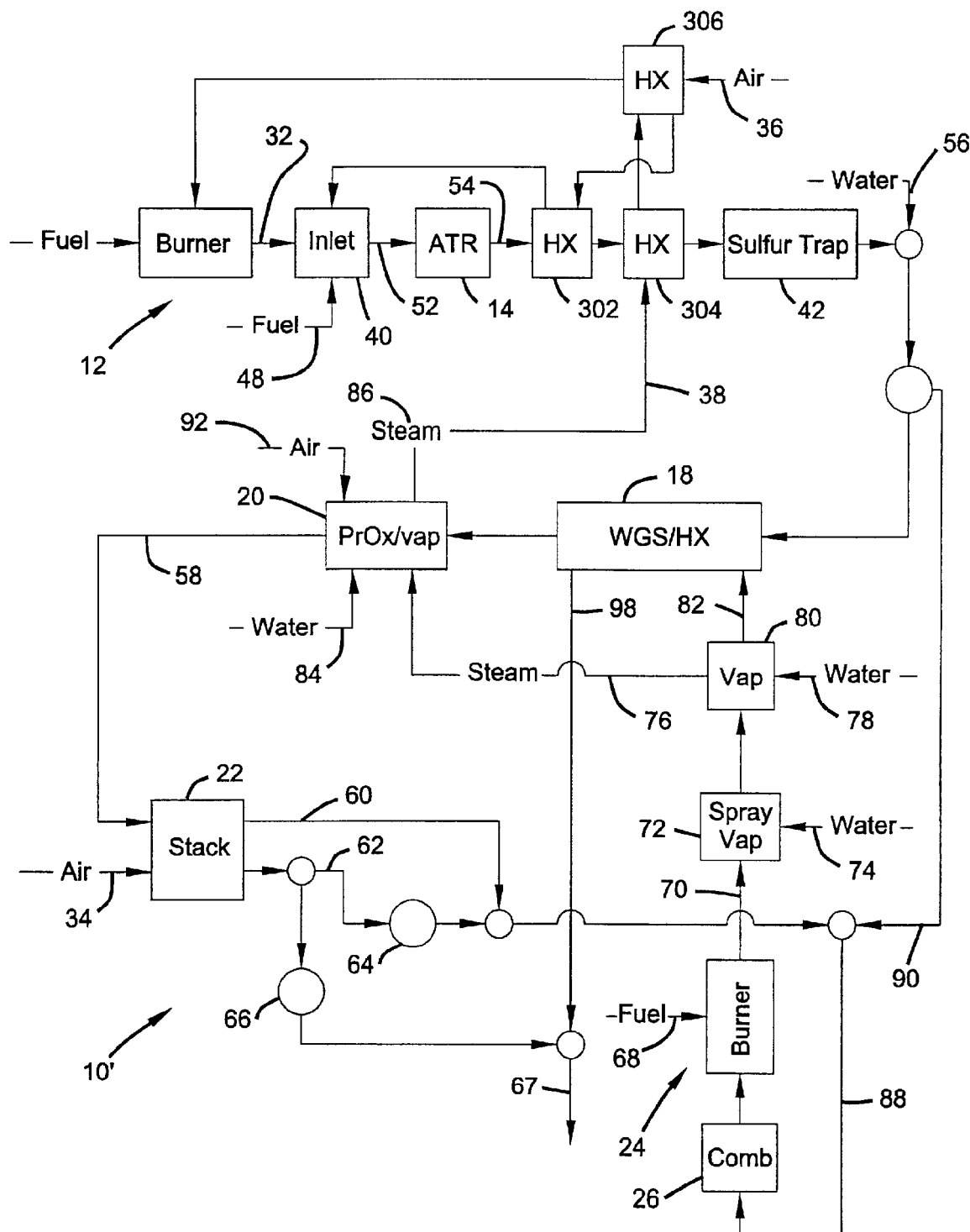
FIG. 3 is a schematic view illustrating a fuel processor according to a second embodiment of the present invention.
Figure 4:
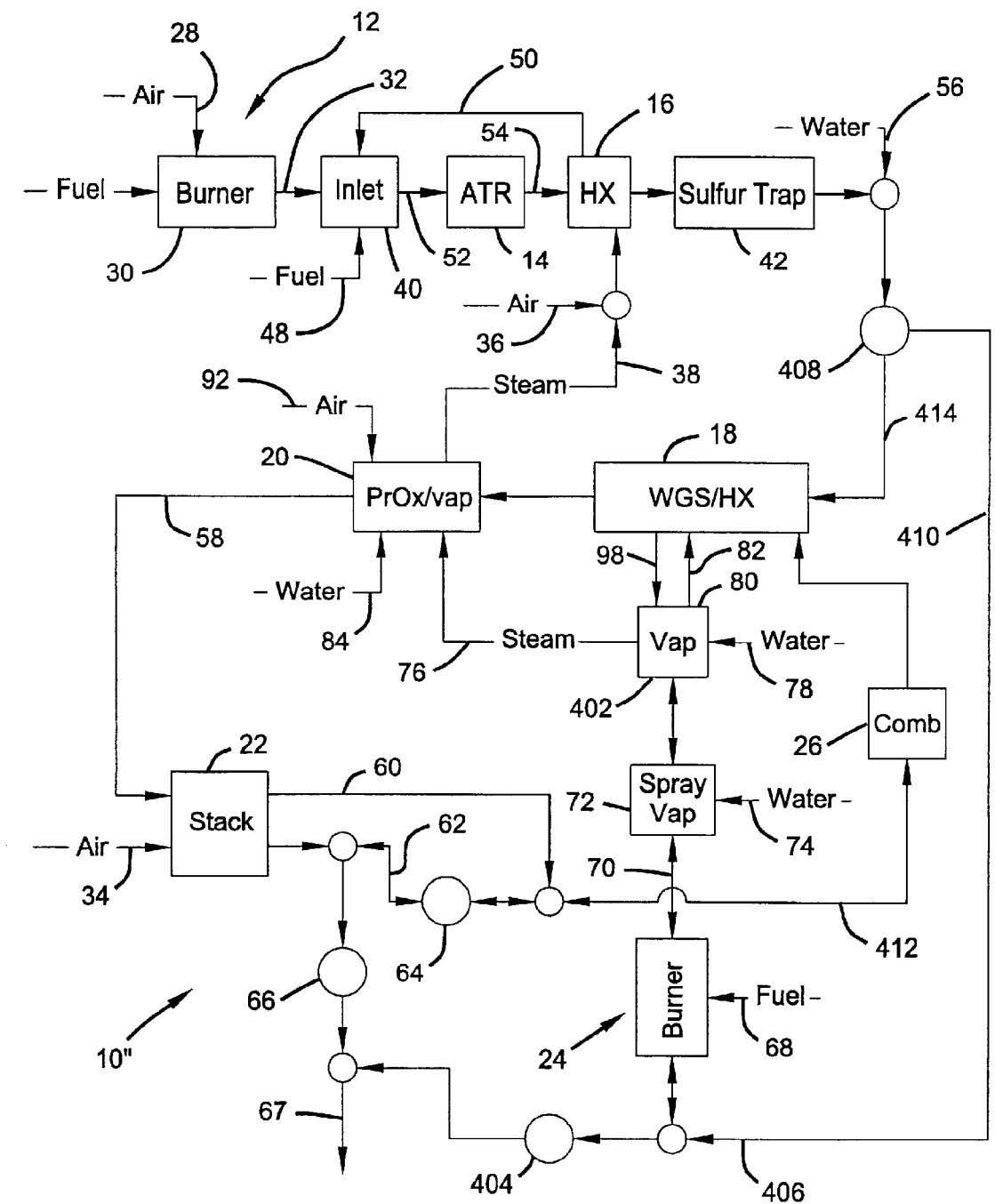
FIG. 4 is a schematic view illustrating a fuel processor according to a third embodiment of the present invention.

As best seen in FIGS. 3 and 4, alternative embodiments of the present invention are illustrated, generally indicated as 10' and 10", respectively. It should be noted that like reference numerals designate like or corresponding parts throughout the several views.

Referring in particular to FIG. 3, reformer air inlet stream 36 of fuel processor 10' is used to serve first burner system 12. This arrangement may require a substantially larger flow control range for reformer air inlet stream 36. However, if a single reformer air inlet stream 36 is used with a single heat exchangers (such as heat exchanger 16 illustrated in FIG. 1), the inlet air and steam (such as reformer air and steam flow 50) includes both air and steam, which may potentially extinguish the flame within first burner system 12 during a startup cycle. Therefore, as seen in FIG. 3, three heat exchangers 302, 304, and 306 may be used to provide a dry combustion air to first burner system 12.

According to this embodiment, reformer air inlet stream 36 and reformer steam inlet stream 38 are heated separately. The separate steam line then enters downstream from first burner system 12, as shown in FIG. 3, to reduce pressure drop and minimize the potential for flame extinguishing in first burner system 12.

Still referring to FIG. 3, run vaporizer 96 may be eliminated and start vaporizer 80 may be used for producing the required steam output, thereby reducing the number of necessary components. However, it should be understood that the amount of steam through steam flow 76 might be reduced as a result of the need to regulate the temperature of exhaust stream 82 to WGS/HX 18.

Referring now to FIG. 4, an alternative arrangement is illustrated using a single vaporizer 402 is used to replace start vaporizer 80 and run vaporizer 96. However, as seen in FIG. 4, the flow direction through vaporizer 402 is reversible so as to function upstream of WGS/HX 18 during startup and downstream of WGS/HX 18 after startup. This requires the addition of an on/off exhaust valve 404 to redirect exhaust flow 406. According to this embodiment during startup, a three-way bypass valve 408 is actuated such that flow is directed through bypass line 410. Exhaust valve 404 is closed to prevent the flow through bypass line 410 from going to exhaust 67, thereby directing the flow to second burner system 24. Combustor air control valve 64 and exhaust backpressure valve 66 are each opened to allow the exhaust flow out to exhaust 67.

Hence, the flow path during a startup cycle is from first burner system 12, through reformer 14, heat exchanger 16, sulfur trap 42, through bypass valve 408 to bypass line 410, and then to second burner system 24. From second burner system 24, exhaust gases flow through spray vaporization zone 72, vaporizer 402, WGS/HX 18, and catalytic combustor 26. After catalytic combustor 26, exhaust gases flowing through line 412 are routed to exhaust 67 through open valves 64 and 66. The control of first burner system 12 and second burner system 24, in addition to the water flows, is control as described above with relation to the system illustrated in FIG. 1.

For transition to normal operation, the present embodiment requires that valving be changed before transitioning reformer 14 to fuel rich operation. That is, when fuel processor 10" has been heated to operating temperature, first fuel inlet stream 30 and second fuel inlet stream 68 are stopped and first air inlet stream 28 is closed. Reformer steam 38 from vaporizer 402 may continue to purge reformer 14, heat exchanger 16, and sulfur trap 42 of air before initiating flow into WGS/HX 18. Bypass valve 408 is then actuated to direct flow through line 414 to WGS/HX 18 and PrOx/vaporizer reactor 20.

Air flow to catalytic combustor 26 is established through its normal flow path by starting stack inlet air stream 34 through fuel cell stack 22, cathode exhaust 62, combustor air control valve 64 (with back pressure from the closure of exhaust back pressure valve 66), and line 412. Exhaust valve 404 is then opened to permit flow from exhaust stream 70 to exhaust 67. Fuel rich flow into reformer 14 is then initiated by starting reformer fuel inlet stream 48, reformer air inlet stream 36, PrOx air inlet stream 92, and PrOx inlet water flow 84. Timing of fuel inlet stream 48, air inlet stream 36, PrOx air stream 92, PrOx water stream 84, and vaporizer water stream 78 may have offsets with relations to each other dependent on the physical hardware utilized. Fuel processor 10" is now in normal operation mode. With this arrangement, unload of fuel cell stack 22 is handled by increasing the flow rate of cathode exhaust 62 through combustor air control valve 64.

According to the principles of the present invention, a fuel processor is provided that is capable of heating the fuel processor components quickly to achieve proper operating temperatures for startup. Furthermore, the fuel processor of the present invention maximizes this heat input into the fuel processor while minimizing the tendency to form carbon. Still further, the fuel processor of the present invention provides a fuel processor capable of heating the fuel processor components while minimizing the use of electrical energy during startup and the reliance on catalytic reactions. It should be readily appreciated by those skilled in the art that the present invention enables the potential usage of inexpensive CuZn catalyst only without the need for an additional coolant loop. Moreover, the tight control of temperatures within the fuel processor, which is afforded by the present invention, enables the optimization of reactor size and catalyst usage resulting in reduced active metal costs. Still further, the present invention provides improved transient carbon monoxide concentration performance.

The description of the invention is merely exemplary in nature and, thus, variations are not to be regarded as a departure from the spirit and scope of the invention.

What is claimed is:

1. A reforming fuel cell system comprising:
   a reformer converting a hydrogen-containing fuel to produce an $H_2$-containing reformate having a level of carbon monoxide;
   a first reactor operable to reduce said level of carbon monoxide of said reformate;
   a fuel cell stack generating electrical energy from said reformate and discharging an $H_2$-containing anode effluent and an $O_2$-containing cathode effluent;
   a combustor having a catalyst bed disposed therein for burning said anode effluent to generate an exhaust gas;
   a heat exchanger thermally coupled to said first reactor to control the temperature thereof, said heat exchanger having an input fluidly coupled to said combustor to receive said exhaust gas; and
   a controller operable for metering air flow to said combustor to control the combustion temperature thereof.

2. The system of claim 1 wherein said controller comprises:
   a cathode control valve system disposed between said fuel cell stack and said combustor, said cathode control valve system operable to direct said cathode effluent to said combustor to control the temperature of said combustor as a function of the $H_2$ content of said anode effluent.

3. The system of claim 2 wherein said cathode control valve system comprises:
   a first control valve fluidly coupled between said fuel cell stack and said combustor, said first control valve selectively actuated between an opened position to enable flow of said cathode effluent to said combustor and a closed position to prevent flow of said cathode effluent to said combustor; and
   a second control valve fluidly coupled between said fuel cell stack and an exhaust passage, said second control valve selectively actuated between an opened position to enable exhausting of said cathode effluent and a closed position to provide a back pressure to facilitate flow of said cathode effluent through said first control valve.

4. The system of claim 1, further comprising:
   a second reactor disposed between said first reactor and said fuel cell stack, said second reactor being operable to further reduce carbon monoxide levels of said reformate exiting said first reactor;
   a combustion heater outputting a heated exhaust stream; and
   a start vaporizer disposed downstream from said combustion heater, said start vaporizer being exposed to said heated exhaust stream for vaporizing an inlet fluid to produce a steam, said steam from said start vaporizer being directed to a heat exchanger element associated with said second reactor for heating said second reactor.

5. The system of claim 4, further comprising:
   a spray vaporizer selectively injecting a cooling fluid into said heated exhaust stream to reduce the fluid temperature thereof.

6. The system of claim 4, further comprising:
   a run vaporizer exposed to an exhaust flow from a heat exchanger element of said first reactor for vaporizing an inlet fluid to produce a steam, said steam from said run vaporizer being directed to an inlet of said reformer.

7. The system of claim 1, further comprising:
   a second reactor disposed between said first reactor and said fuel cell stack, said second reactor being operable to further reduce carbon monoxide levels of said reformate exiting said first reactor;
   a combustion heater outputting a heated exhaust stream;
   a spray vaporizer selectively injecting a cooling fluid into said heated exhaust-stream to control the fluid temperature thereof; and
   a start vaporizer fluidly coupled to said combustion heater, said start vaporizer being exposed to said heated exhaust stream for vaporizing an inlet fluid to produce a steam stream, said steam stream being directed to a heat exchanger element of said second reactor for heating said second reactor;
   wherein a flow through said combustion heater, said spray vaporizer, said start vaporizer, said first reactor, and said combustor is reversible so as to alternatively position said combustion heater, said spray vaporizer, and said start vaporizer upstream and downstream from said first reactor.

8. A fuel processor for rapid start and operational control, said fuel processor comprising:
   a plurality of fuel cells discharging an $H_2$-containing anode effluent and an $O_2$-containing cathode effluent;
   a reformer converting a hydrogen-containing fuel selected from the group consisting of alcohol and hydrocarbons to $H_2$ to produce a reformate for fueling said plurality of fuel cells;
   a shift reactor disposed between said plurality of fuel cells and said reformer, said shift reactor having a catalytic region operable to reduce carbon monoxide levels of said reformate and a heat exchange region;
   a preferential oxidation reactor disposed between said shift reactor and said plurality of fuel cells, said preferential oxidation reactor being operable to further reduce carbon monoxide levels of said reformate exiting said shift reactor;
   a combustor providing hot exhaust gas to said heat exchange region of said shift reactor, said combustor having a catalyst bed disposed therein for burning said anode effluent and said cathode effluent to generate said hot exhaust gas;
   a combustion burner operably coupled to said combustor, said combustion burner outputting a heated exhaust stream; and
   a cathode control valve system disposed between said plurality of fuel cells and said combustor, said cathode control valve system operable to direct said cathode effluent to said combustor to control a temperature of said combustor when the $H_2$ content of said anode effluent increases.

9. The fuel processor according to claim 8 wherein said cathode control valve system comprises:
   a first control valve fluidly coupled between said plurality of fuel cells and said combustor, said first control valve selectively actuated between an opened position to enable flow of said cathode effluent to said combustor and a closed position to prevent flow of said cathode effluent to said combustor; and a second control valve fluidly coupled between said plurality of fuel cells and an exhaust passage, said second control valve selectively actuated between an opened position to enable exhausting of said cathode effluent and a closed position to provide a back pressure to facilitate flow of said cathode effluent through said first control valve.

10. The fuel processor according to claim 9, further comprising:

a spray vaporizer selectively injecting a cooling fluid into said heated exhaust stream to reduce the fluid temperature thereof; and a start vaporizer disposed downstream from said combustion burner, said start vaporizer being exposed to said heated exhaust stream for vaporizing an inlet fluid to produce a steam, said steam from said start vaporizer being directed to a heat exchanger element associated with said preferential oxidation reactor for heating said preferential oxidation reactor.

11. The fuel processor according to claim 10, further comprising:

a run vaporizer exposed to an exhaust flow of said heat exchanger region of said shift reactor for vaporizing an inlet fluid to produce a steam, said steam from said run vaporizer being directed to an inlet of said reformer.

12. The fuel processor according to claim 8, further comprising:

a spray vaporizer selectively injecting a cooling fluid into said heated exhaust stream to control the fluid temperature thereof; and a start vaporizer fluidly coupled to said combustion burner, said start vaporizer being exposed to said heated exhaust stream for vaporizing an inlet fluid to produce a steam stream, said steam stream from said start vaporizer being directed to a heat exchanger element of said preferential oxidation reactor for heating said preferential oxidation reactor;

wherein a flow through said combustion burner, said spray vaporizer, said start vaporizer, said shift reactor, and said combustor is reversible so as to alternatively position said combustion burner, said spray vaporizer, and said start vaporizer upstream and downstream from said shift reactor.

13. A fuel processor for rapid start and operational control, said fuel processor comprising:

a plurality of fuel cells discharging an $H_2$-containing anode effluent and an $O_2$-containing cathode effluent;

a reformer converting a hydrogen-containing fuel selected from the group consisting of alcohol and hydrocarbons to $H_2$ to produce a reformate for fueling said plurality of fuel cells;

a shift reactor disposed between said plurality of fuel cells and said reformer, said shift reactor being operable to reduce carbon monoxide levels of said reformate;

a preferential oxidation reactor disposed between said shift reactor and said plurality of fuel cells, said preferential oxidation reactor being operable to further reduce carbon monoxide levels of said reformate exiting said shift reactor;

a combustor providing hot exhaust gas to said shift reactor, said combustor being fueled by said fuel and said anode effluent, said combustor having a catalyst bed disposed therein for burning said fuel and said anode effluent to generate said hot exhaust gas;

a combustion burner operably coupled to said combustor, said combustion burner outputting a heated exhaust stream;

a spray vaporizer selectively injecting a cooling fluid into said heated exhaust stream to reduce the fluid temperature thereof; and a controller operable for metering air flow to said combustor to control the combustion temperature of said combustor.

14. The fuel processor according to claim 13, further comprising:

a cathode control valve system disposed between said plurality of fuel cells and said combustor, said cathode control valve system operable to direct said cathode effluent to said combustor to limit a temperature of said combustor when the $H_2$ content of said anode effluent increases.

15. The fuel processor according to claim 14 wherein said cathode control valve system comprises:

a first control valve fluidly coupled between said plurality of fuel cells and said combustor, said first control valve selectively actuated between an opened position to enable flow of said cathode effluent to said combustor and a closed position to prevent flow of said cathode effluent to said combustor; and a second control valve fluidly coupled between said plurality of fuel cells and an exhaust passage, said second control valve selectively actuated between an opened position to enable exhausting of said cathode effluent and a closed position to provide a back pressure to facilitate flow of said cathode effluent through said first control valve.

16. The fuel processor according to claim 13, further comprising:

a start vaporizer disposed downstream from said combustion burner, said start vaporizer being exposed to said heated exhaust stream for vaporizing an inlet fluid to produce a steam, said steam from said start vaporizer being directed to a heat exchanger element associated with said preferential oxidation reactor for heating said preferential oxidation reactor.

17. The fuel processor according to claim 16, further comprising:

a run vaporizer exposed to an exhaust flow from a heat exchanger element of said shift reactor for vaporizing an inlet fluid to produce a steam, said steam from said run vaporizer being directed to an inlet of said reformer.

18. The fuel processor according to claim 13, further comprising:

a start vaporizer fluidly coupled to said combustion burner, said start vaporizer being exposed to said heated exhaust stream for vaporizing an inlet fluid to produce a steam stream, said steam stream from said start vaporizer being directed to a heat exchanger element of said preferential oxidation reactor for heating said preferential oxidation reactor;

wherein a flow through said combustion burner, said spray vaporizer, said start vaporizer, said shift reactor, and said combustor is reversible so as to alternatively position said combustion burner, said spray vaporizer, and said start vaporizer upstream and downstream from said shift reactor.

* * * * *